US012390920B2

(12) United States Patent
Srivastava

(10) Patent No.: US 12,390,920 B2
(45) Date of Patent: Aug. 19, 2025

(54) FOLDABLE WORKBENCH WITH PUSH AND PULL MECHANISM

(71) Applicant: APPL Industries Ltd., Maharashtra (IN)

(72) Inventor: Sanjay Srivastava, Maharashtra (IN)

(73) Assignee: APPL Industries Ltd., Maharashtra (IN)

( * ) Notice: Subject to any disclaimer, the term of this patent is extended or adjusted under 35 U.S.C. 154(b) by 192 days.

(21) Appl. No.: 18/194,299

(22) Filed: Mar. 31, 2023

(65) Prior Publication Data

US 2024/0131679 A1 Apr. 25, 2024
US 2024/0227153 A9 Jul. 11, 2024

(51) Int. Cl.
*B25H 1/04* (2006.01)

(52) U.S. Cl.
CPC .................................... *B25H 1/04* (2013.01)

(58) Field of Classification Search
CPC .... B25H 1/04; B25H 1/06; B25H 1/02; A47B 3/08; A47B 3/0818; A47B 3/0918; A47B 2003/0821; A47B 2003/0827; A47B 9/16; A47B 2200/0064; Y10S 269/901
USPC ....... 269/289 R, 901, 136, 286.1; 144/286.1; 108/128, 129, 130
See application file for complete search history.

(56) References Cited

U.S. PATENT DOCUMENTS 10,562,174 B2 * 2/2020 Omry ...................... A47B 3/08
11,883,945 B2 * 1/2024 Panosian ................ B25H 1/04

* cited by examiner

*Primary Examiner* — Robert F Neibaur
(74) *Attorney, Agent, or Firm* — Renner, Otto, Boisselle & Sklar, LLP

(57) ABSTRACT

Disclosed is a foldable workbench (100) with a simple push and pull mechanism for opening and closing of legs without compromising on quick opening and folding performance. The leg opening and closing mechanism of workbench (100) is provided without rack and pinion gears, belt and pulley system or complex linkages with bearings, etc. A simple pulling and pushing action of a handle extends and retracts the first and second pair of legs (20A, 20B) to open and close.

4 Claims, 5 Drawing Sheets

FOLDABLE WORKBENCH WITH PUSH AND PULL MECHANISM

This application claims priority to India Patent Application No. 202221060173 filed Oct. 21, 2022, the entire disclosures of which is hereby incorporated by reference.

FIELD OF THE INVENTION

The present invention relates to work-benches, and more specifically it relates to the workbenches which may be folded into compact spaces.

BACKGROUND OF THE INVENTION

A typical workbench is a sturdy, flat, smooth, molded surface that comes in a variety of sizes designed for specific tasks. Workbenches are very versatile tools that have multiple applications and are used differently depending on their purpose. The first major function of a workbench is to support applications that involve large tools. Industrial workbenches are used for finishing, assembly, and component repair. Well-constructed workbenches have strong supports that can handle jobs requiring the use of heavy tools and machinery. A portable workbench is particularly useful because it supports a tool in an easy-to-access, elevated position.

Foldable/foldable workbenches are well known in the art. These are provided to enable the user to store and/or carry tools from one location to another. After transport from a storage location, the workbench is opened at a work location, thereby providing a work area for the user. The existing foldable workbenches have several disadvantages e.g. they are generally complex in configuration, thereby being expensive to manufacture and difficult to set up. Furthermore, the tools are often difficult to store when the workbench is folded and/or are not easily accessible when the workbench is in its open position. Moreover, the existing industrial workbenches available in market are having leg open and close mechanism driven by additional sub system e.g. rack and pinion gears, belt and pulley system or complex linkages with bearing, providing mechanical advantage. However, due to additional sub system to open and close legs results in additional number of components required for the workbench assembly which in turn results in higher cost of manufacturing, servicing and spare part management. In existing foldable workbenches, the useful space required for clamp holders etc., is blocked in open conditions by packaging space of rack&pinion or other complex gear or roller mechanisms.

Accordingly, there exists a need to provide a new and improved foldable workbench that can overcome the drawbacks in the prior art.

OBJECTS OF THE INVENTION

An object of the present invention is to provide a simple linkage mechanism for opening and closing of legs of a foldable workbench.

Another object of the present invention is to provide a foldable workbench with reduced number of components.

Still another object of the present invention is to provide a foldable workbench without any extra subsystem with gears or rollers.

Yet another object of the present invention is to provide a foldable workbench with more usable area in open condition for legs.

SUMMARY OF THE INVENTION

Accordingly, the present invention provides a foldable workbench comprising a table portion, a first pair of legs, a second pair of legs and a handle having a handle grip. The table portion is provided with two pairs of guiding brackets on either sides of the lower surface thereof and each guiding bracket is provided with a horizontal slot thereon. The first and second pair of legs are rotatably and slidably fitted in two pairs of guiding brackets using four connecting links, connecting rods, a connecting bracket and a pin. The first and second pair of legs are coupled with the handle in such a way that pulling and pushing action of the handle extends and retracts the first and second pair of legs to open and close.

BRIEF DESCRIPTION OF THE DRAWINGS

The objects and advantages of the present invention will become apparent when the disclosure is read in conjunction with the following figures, wherein.

DETAILED DESCRIPTION OF THE EMBODIMENTS

The foregoing objects of the invention are accomplished and the problems and shortcomings associated with prior art techniques and approaches are overcome by the present invention described in the present embodiments.

The present invention provides a foldable workbench with a simple push and pull mechanism for opening and closing of legs without compromising on quick opening and folding performance.

The present invention is illustrated with reference to the accompanying drawings, throughout which reference numbers indicate corresponding parts in the various figures. These reference numbers are shown in bracket in the following description and in the table below.

TABLE

| Ref No: | Component |
|---|---|
| 10 | Table portion |
| 20A | First pair of legs |
| 20B | Second pair of legs |
| 30 | Handle grip |
| 40 | Linkages |
| 50 | Handle body |
| 60 | First guiding bracket |
| 65 | Horizontal slot of the first guiding bracket |
| 70 | Second guiding bracket |
| 75 | Horizontal slot of the second guiding bracket |
| 80 | Connector bracket |

TABLE-continued

| Ref No: | Component |
|---|---|
| 90 | First rod |
| 92 | Second rod |
| 94 | Pin |

Figure 1A:
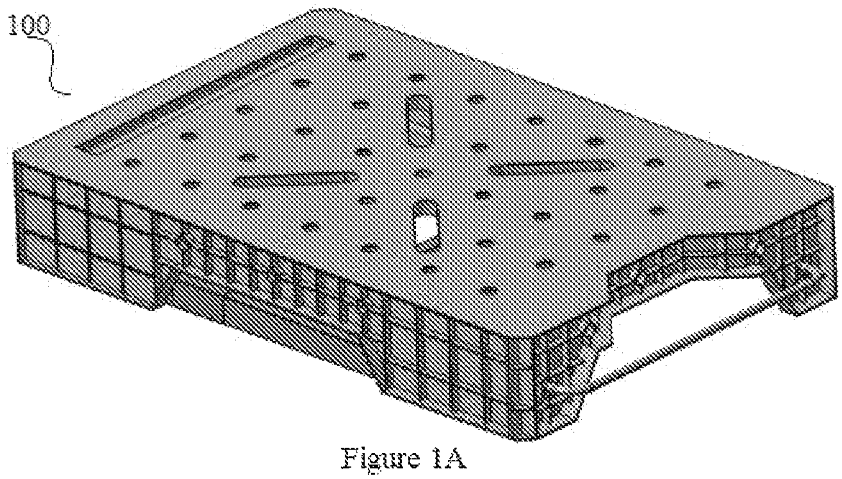
FIGS. 1A and 1B show perspective views of a foldable workbench respectively in legs closed and legs open condition, in accordance with the present invention.
Figure 1B:
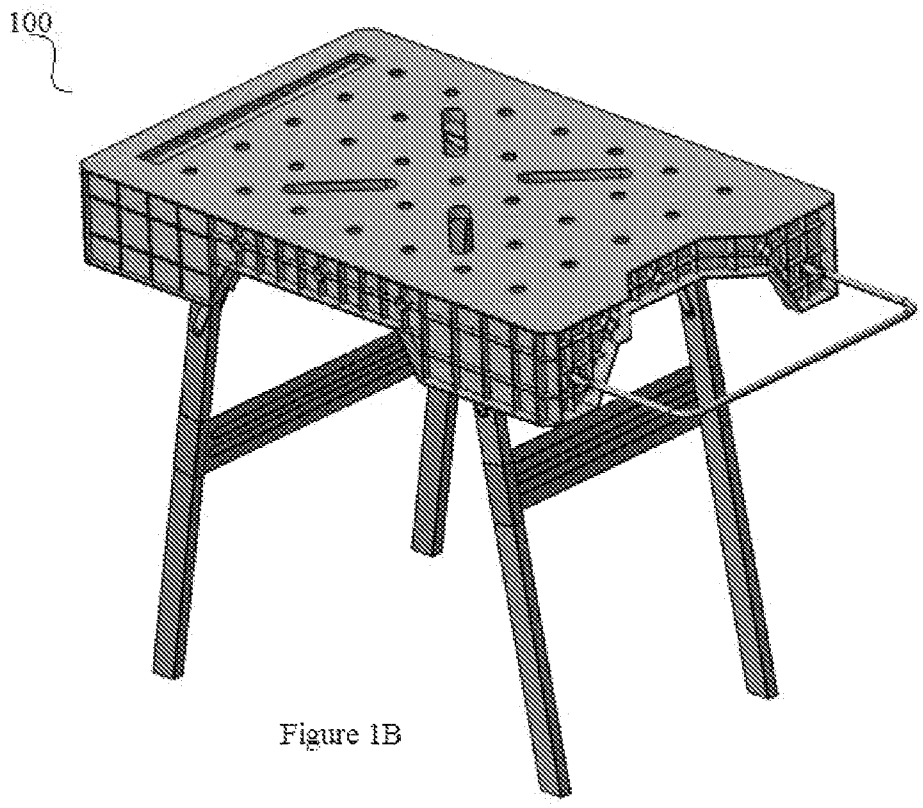
Figure 2:
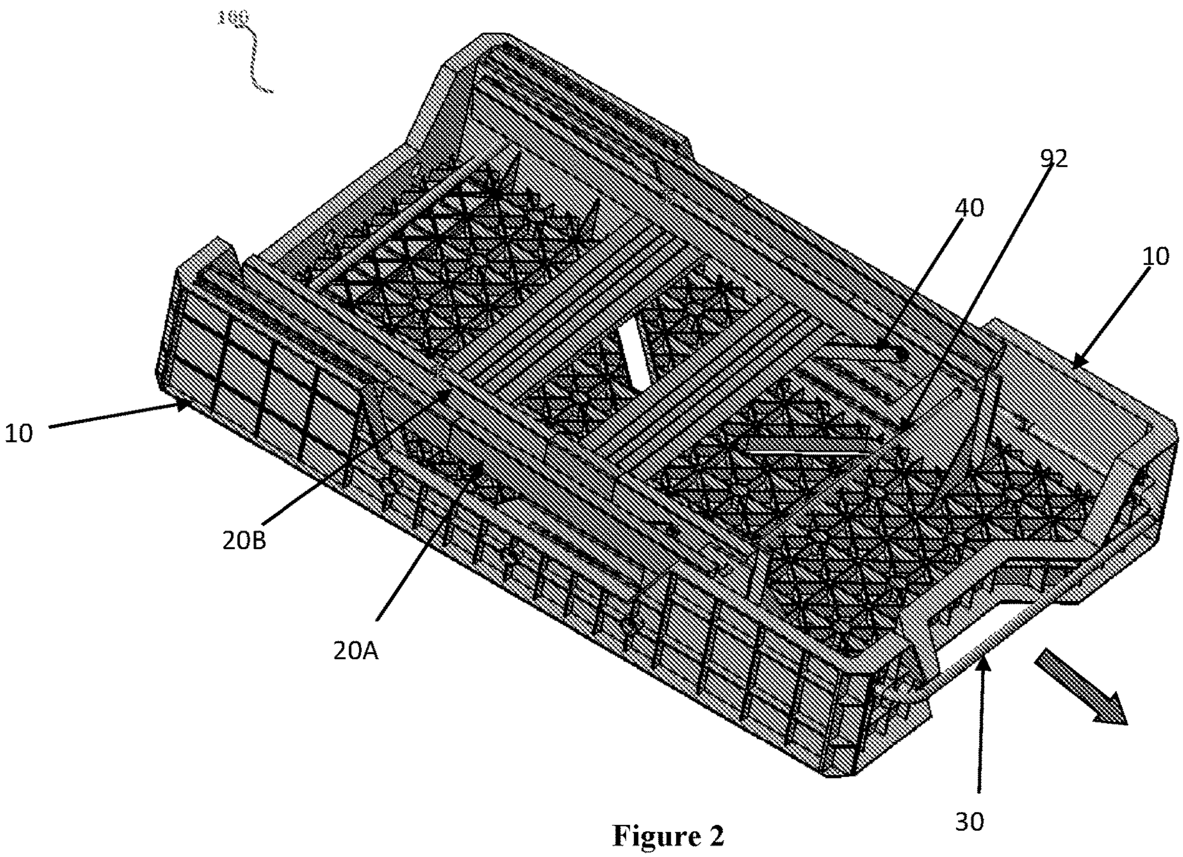
FIG. 2 shows a detailed perspective view of a lower side of the foldable workbench in legs closed condition, in accordance with the present invention.
Figure 3:
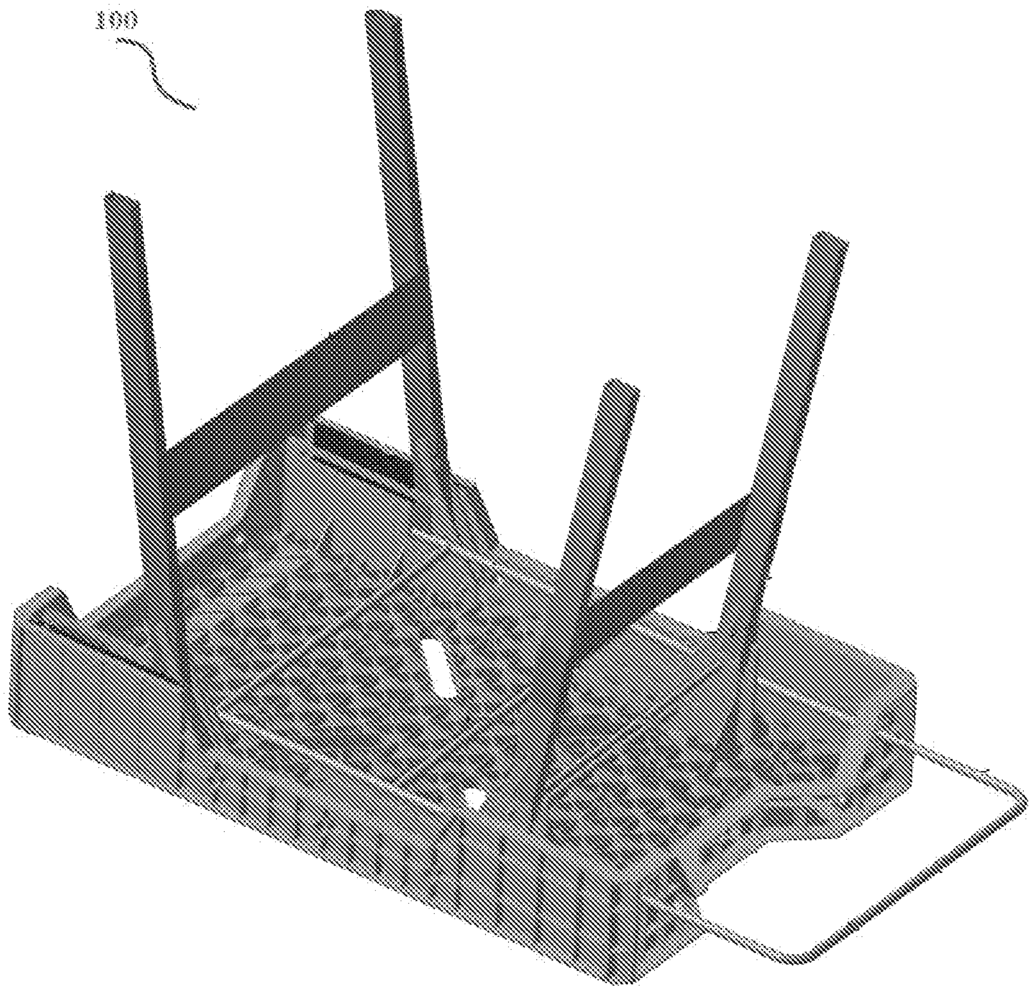
FIG. 3 shows a detailed perspective view of the lower side of the foldable workbench in legs open condition, in accordance with the present invention.
Figure 4:
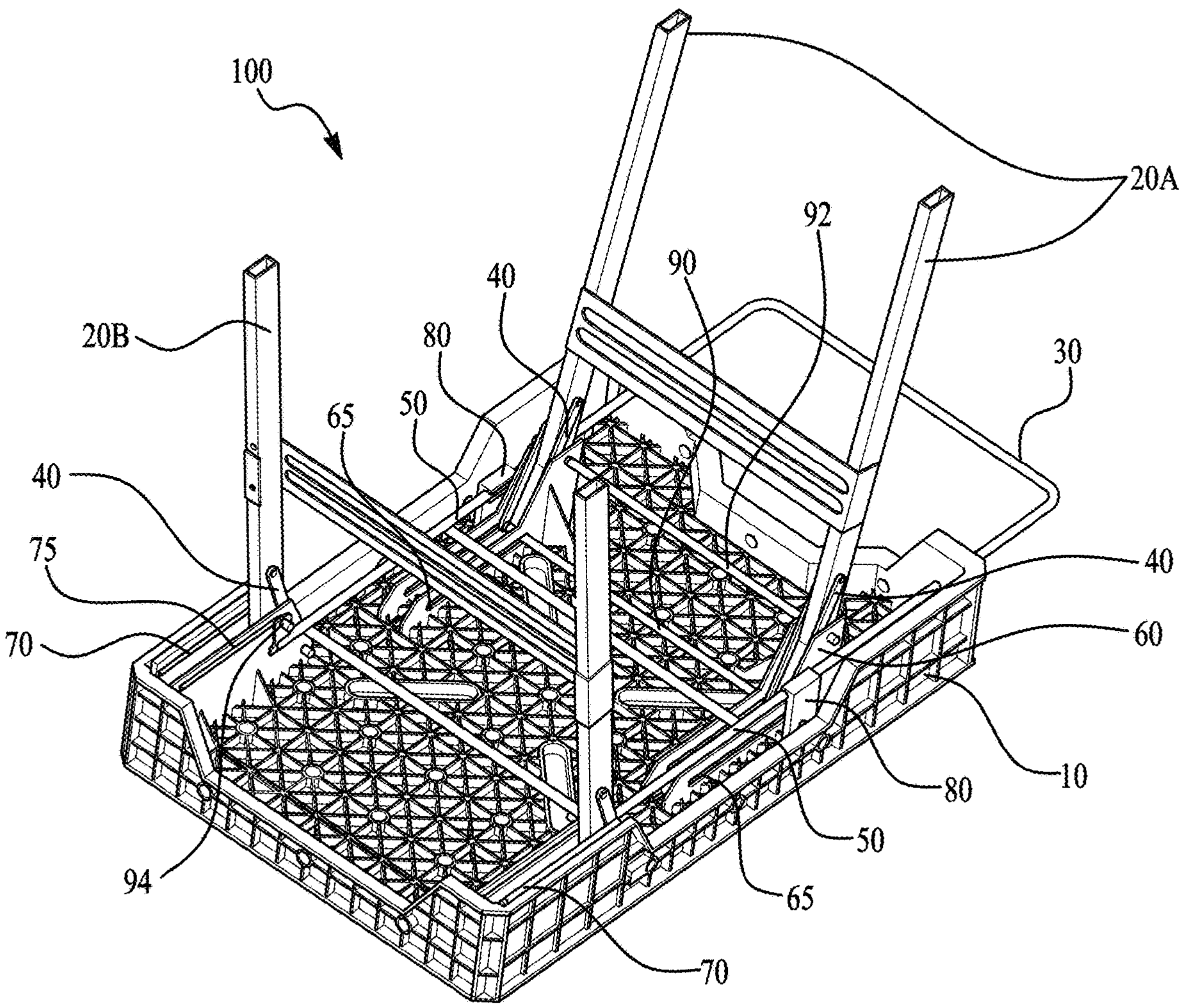
FIG. 4 shows a detailed perspective view of the lower side of the foldable workbench in legs open condition, in accordance with the present invention.
Figure 5:
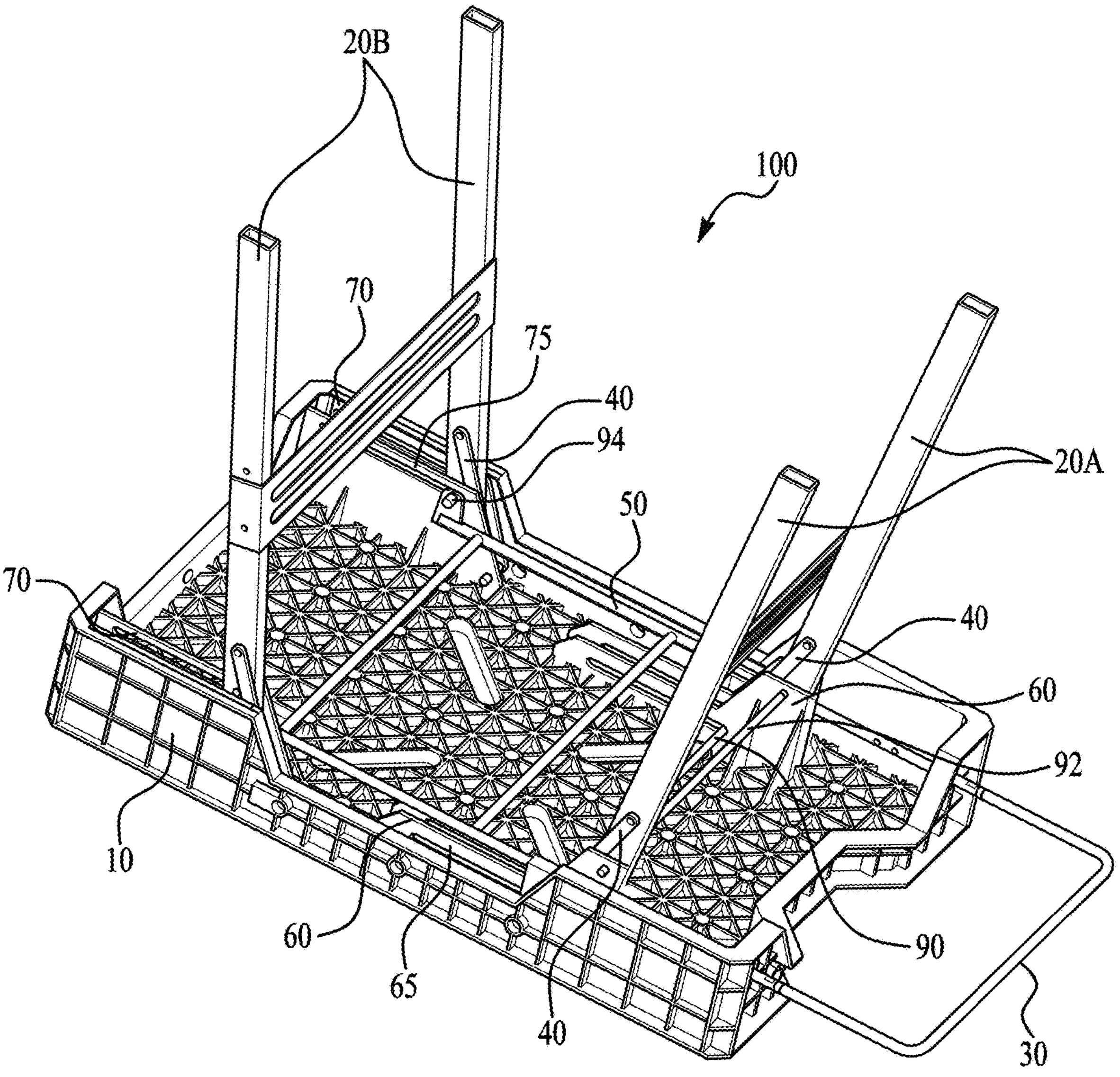
FIG. 5 shows another detailed perspective view of the lower side of the foldable workbench in legs open condition, in accordance with the present invention.

Referring to the FIGS. 1 to 4 a foldable workbench (100) (hereinafter referred as "the workbench (100)") in accordance with the present invention is shown. The workbench (100) comprises of a table portion (10), a first pair of legs (20A), a second pair of legs (20B) and a handle for extending and retracting the legs.

The table portion (10) is of any suitable material providing smooth and sturdy upper surface. A pair of first guiding brackets (60) each first guiding bracket having a bracket portion and a horizontal portion with a slot (65); and pair of second guiding brackets (70), each second guiding bracket having a horizontal portion with a slot (75), are fitted on either ends of the lower surface of the table portion (10).

A first rod (90) is having either ends thereof slidable in the horizontal slot (65) of the pair of first guiding brackets (60). One end of each leg of the first pair of legs (20A) is pivotally fitted in the bracket portion of each of the pair of first guiding brackets (60) with two links (40) at either ends of the first rod (90) connecting thereto to each leg of the first pair of legs (20A). Sliding movement of the first rod (90) in the slot (65) with the link (40) causes the first pair of legs (20A) to open/extend and close/retract.

A second rod (92) is rotatingly fitted between the bracket portions of the two first guiding brackets (60) with each end thereof fitted to a leg of the first pair of legs (20A).

One end of each leg of the second pair of legs (20B) is slidably fitted to each of the second guiding brackets (70) with a pin (94) slidable in the horizontal slot (75) and a link (40) providing connection between the leg and the table portion (10). Sliding movement of the pin (94) in the slot (75) with the link (40) causes the second pair of legs (20B) to open/extend and close/retract.

The handle having a handle grip (30) and a handle body (50) is fitted to the lower side of the table portion (10) with the handle grip (30) extending out of the table portion (10). The handle body (50) with a connector bracket (80) is slidably fixed to the table portion (10) with the first rod (90) coupled to the connector bracket (80). The handle body (50) is coupled to the first pair of legs (20A) through the connector bracket (80) and coupled to the second pair of legs (20B) through the pin (94).

In an operation, when the handle is pulled out, the first pair of legs (20A) and the second pair of legs (20B) extend to open and when the handle is pushed in, the first pair of legs (20A) and the second pair of legs (20B) retract to close and rest below the table portion (10).

In an embodiment the handle is provided with a foldable grip (30) such that when the handle is pulled out to open the legs, the extended portion of the handle grip (30) is folded to reduce the equipment footprint.

ADVANTAGES OF THE INVENTION

The workbench (100) has lesser number of parts than the existing workbenches of the similar type hence it is more economic.

The workbench (100) provides more usable area for clamp positioning.

Service and maintenance of the workbench (100) is easier than the existing workbenches as no gears, pulleys or rotating parts are used in the workbench (100).

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the claims of the present invention.

I claim:

1. A foldable workbench comprising:

a table portion having a pair of first guiding brackets and a pair of second guiding brackets fitted on either ends of a lower surface thereof, wherein each first guiding bracket comprises a bracket portion and a first horizontal portion with a first slot provided thereon, and each second guiding bracket comprises a second horizontal portion with a second slot provided thereon;

a first pair of legs pivotally fitted in the bracket portion of each of the pair of first guiding brackets;

a first rod having either ends thereof slidable in the first horizontal slot with two links at either ends thereof connecting thereto to each leg of the first pair of legs;

a second rod rotatingly fitted between the bracket portions of the two first guiding brackets with either end thereof fitted to a leg of the first pair of legs;

a second pair of legs having one end of each leg fitted to a pin slidable in the respective second horizontal slot and connected to the table portion through a link; and a handle having a handle grip extending out of the table portion and a handle body with a connector bracket slidably fixed to the lower side of the table portion and the first rod coupled to the connector bracket, the handle body coupled to the first pair of legs through the connector bracket and coupled to the second pair of legs through the pin, wherein pulling and pushing action of the handle extends and retracts the first and second pair of legs to open and close.

2. The foldable workbench as claimed in claim 1, wherein the handle grip is foldable.

3. The foldable workbench as claimed in claim 1, wherein the sliding movement of the first rod in the respective first slot with the link causes the first pair of legs to open/extend and close/retract.

4. The foldable workbench as claimed in claim 1, wherein a sliding movement of the pin in the respective second slot with the link causes the second pair of legs to open/extend and close/retract.

* * * * *